(12) United States Patent
Akouri et al.

(10) Patent No.: US 6,347,824 B1
(45) Date of Patent: Feb. 19, 2002

(54) SUNVISOR STORAGE SYSTEM

(75) Inventors: Edward J Akouri, Farmington Hills; Robert J Winters, Brighton, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/585,862

(22) Filed: Jun. 1, 2000

(51) Int. Cl.[7] ............................. B60J 3/02; B60R 7/05
(52) U.S. Cl. ................. 296/97.5; 296/97.1; 296/97.8; 296/37.8; 224/312
(58) Field of Search ............... 296/97.5, 97.8, 296/97.9, 97.12, 97.1, 37.1, 37.7, 37.8; 224/312

(56) References Cited

U.S. PATENT DOCUMENTS

| | | | |
|---|---|---|---|
| 4,275,916 A | * 6/1981 | Skogler | 296/97 |
| 4,486,819 A | * 12/1984 | Marcus et al. | 362/142 |
| 4,521,051 A | * 6/1985 | Cody et al. | 296/97 |
| 4,721,310 A | * 1/1988 | Gavagan et al. | 296/97 |
| 5,244,244 A | * 9/1993 | Gute et al. | 296/97.8 |
| 5,365,416 A | * 11/1994 | Peterson | 362/135 |
| 5,833,299 A | * 11/1998 | Corn | 296/97.11 |
| 5,951,090 A | * 9/1999 | Wilson et al. | 296/97.5 |

* cited by examiner

Primary Examiner—Stephen T. Gordon
Assistant Examiner—Greg Blankenship
(74) Attorney, Agent, or Firm—Mark P. Calcaterra

(57) ABSTRACT

A visor assembly having a lower wall member, an upper wall member, a lid member, a living hinge and a partition member. The living hinge pivotably couples the lid member to the upper wall member. The partition member cooperates with the lower and upper wall members to form a storage compartment. The living hinge permits the lid member to be pivotably moved between a first position in which the lid member substantially clears the storage compartment parallel and a second position in which the lid member substantially covers the storage compartment.

6 Claims, 2 Drawing Sheets

SUNVISOR STORAGE SYSTEM

BACKGROUND OF THE INVENTION

1. Technical Field

The present invention relates generally to vehicle visors and more particularly to a visor having an integrally formed covered storage compartment.

2. Discussion

It has long been recognized that the visor of a vehicle is a convenient location for the storage of small personal articles, such as sunglasses and the like. Typically, visors have been provided with pockets, flaps or trays mounted thereon for receiving such articles. This approach is typically used in the prior art to provide attachments to the upholstered surface of the visors. When such prior art includes an opening flap or tray, they typically open in a downward direction which tends to obstruct the view of the vehicle operator.

One device proposed to overcome the drawbacks of the prior art is disclosed in U.S. Pat. No. 4,275,916 entitled "Visor With Storage Compartment", the disclosure of which is hereby incorporated by reference as if fully set forth herein. This device includes a visor body having a generally rectangular recess that is adapted to receive a covered storage compartment assembly. The covered storage compartment assembly includes a frame, a cover and numerous small components such as springs, which must be assembled together prior to installing the covered storage compartment to a visor body. The use of numerous additional components and the requirement for labor to subassemble and install the covered storage compartment may add considerable cost to a visor assembly. Accordingly, there is a need in the art for a visor with a covered storage compartment that may be more easily and cost-effectively produced.

SUMMARY OF THE INVENTION

It is one object of the present invention to provide a visor assembly with a covered storage compartment which can be produced at a relatively lower cost.

It is another object of the present invention to provide a visor assembly with a covered storage compartment with a lid member that is unitarily formed with a body structure of the visor.

In one preferred form, the present invention provides a visor assembly having a lower wall member, an upper wall member, a lid member, a living hinge and a partition member. The living hinge pivotably couples the lid member to the upper wall member. The partition member cooperates with the lower and upper wall members to form a storage compartment. The living hinge permits the lid member to be pivotably moved between a first position in which the lid member substantially clears the storage compartment parallel and a second position in which the lid member substantially covers the storage compartment.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
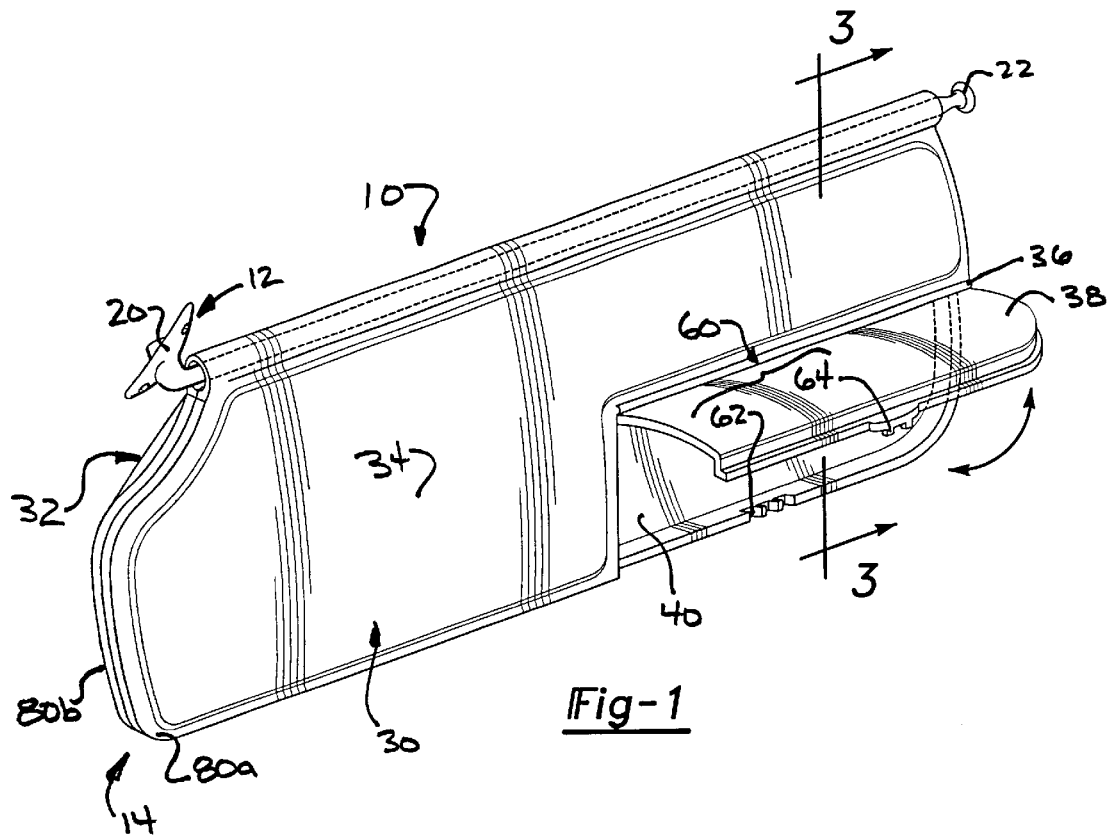
FIG. 1 is a perspective view of a visor assembly constructed in accordance with the teachings of the present invention.

With reference to FIG. 1 of the drawings, a visor assembly constructed in accordance with the teachings of the present invention is generally indicated by reference numeral 10. Visor assembly 10 is shown to include a bracket assembly 12 and a visor structure 14. Bracket assembly 12 is conventional in construction and need not be discussed in detail herein. Briefly, bracket assembly 12 includes a bracket mount 20 for pivotally mounting visor assembly 10 to the headliner of a vehicle (not shown) and a support post 22 for supporting visor assembly 10 in a bracket centrally positioned in the headliner for holding visor assembly 10 in a position along the top of the front windshield.

Figure 2:
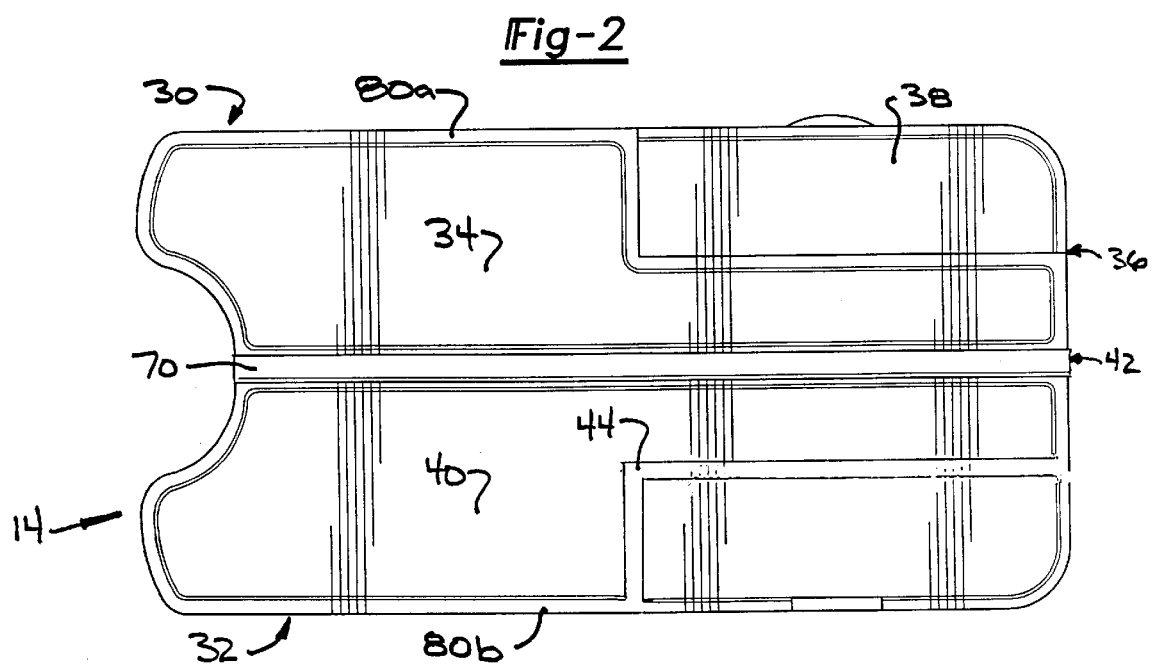
FIG. 2 is a plan view of a portion of the visor assembly of FIG. 1 illustrating the visor structure in an unfolded condition.
Figure 3:
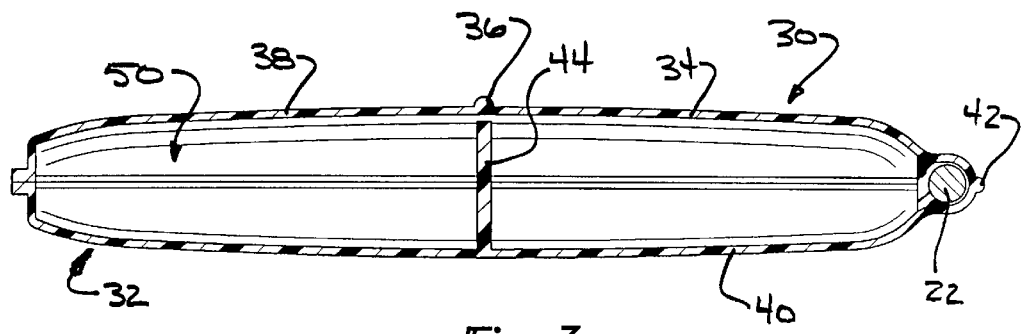
FIG. 3 is a cross-sectional view of the visor of FIG. 1 taken along the line 3—3.

With additional reference to FIGS. 2 and 3, visor structure 14 is shown to include a first body portion 30 and a second body portion 32. First body portion 30 defines a generally horizontal upper wall member 34, a living hinge 36 and a lid member 38. Living hinge 36 pivotably couples lid member 38 to upper wall member 34. Second body portion 32 defines a generally horizontal lower wall member 40. Preferably, first and second body portions 30 and 32 are pivotably coupled to one another at their rearward edges via a second living hinge 42. Construction in this manner is advantageous in that it permits visor structure 14 to be unitarily formed, by injection molding from a polypropylene material, for example.

Figure 4:
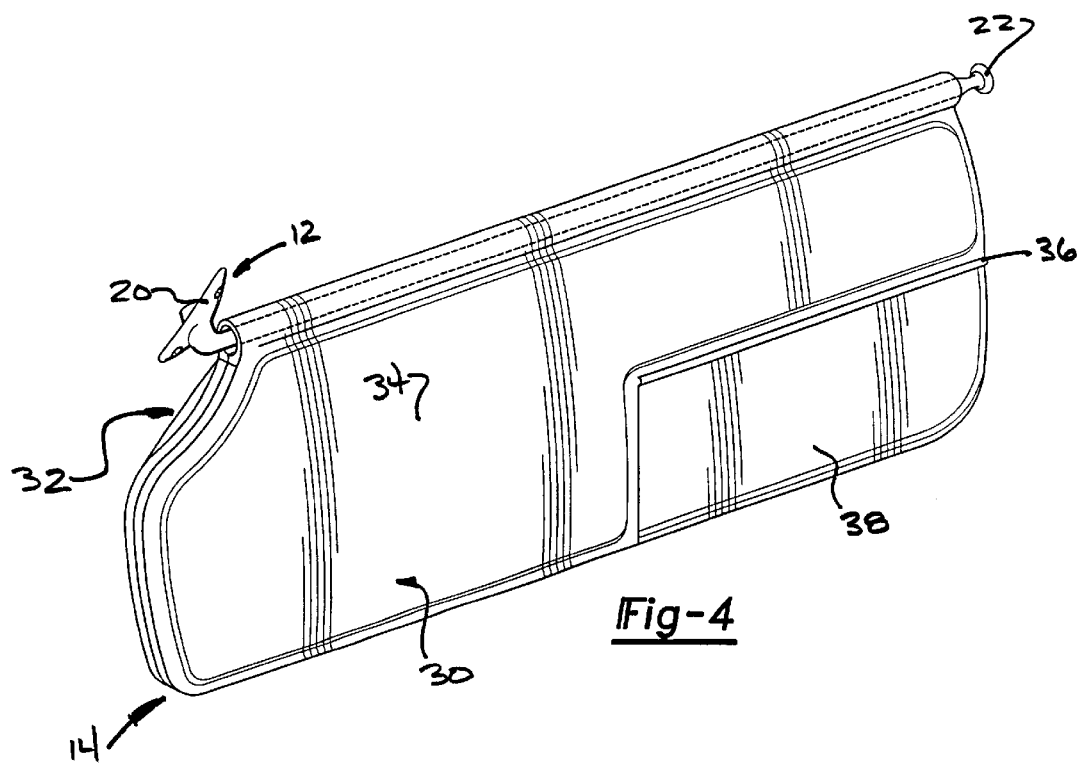
FIG. 4 is a perspective view similar to that of FIG. 1 but illustrating the lid member in a closed position.

In the particular embodiment illustrated, a unitarily formed partition member 44 is coupled to lower wall member 40 and depends upwardly therefrom. Partition member 44 cooperates with upper and lower wall members 34 and 40 to form storage compartment 50 (FIG. 3). Those skilled in the art will understand that partition member 44 may alternatively be coupled to upper wall member 34 or formed in two or more sections, with some sections being coupled to upper wall member 34 and other sections being coupled to lower wall member 40. Living hinge 36 permits lid member 38 to be pivotably moved between a first or open position, as shown in FIG. 1, in which lid member 38 substantially clears the storage compartment 50 and a second or closed position, as shown in FIG. 4, in which lid member 38 substantially covers the storage compartment 50.

As best shown in FIG. 1, visor assembly 10 preferably includes a latch mechanism 60 for securing the lid member 38 in the closed position. In the particular embodiment illustrated, latch mechanism 60 includes a plurality of slots 62 formed into the second body portion 32 and a plurality of tangs 64 formed into the lid member 38. When the lid member 38 is placed in the closed position, the plurality of tangs 64 operatively engage the plurality of slots 62 to securely retain the lid member 38 to the first body portion 30. Those skilled in the art will understand that the plurality of slots 62 may alternatively be formed in the lid member 38 and that the plurality of tangs 64 may alternatively be formed in the second body portion 32.

The support post 22 of bracket assembly 12 is placed in a semi-cylindrical recess 70 (FIG. 2) formed in one of the first and second body portions 30 and 32, the first and second body portions 30 and 32 are folded over onto each other and the edges of the upper and lower wall members 34 and 40 are secured together by a conventional securing means, such as an adhesive material or plastic welding. Thereafter, a suitable upholstery covering may be applied to the outer surfaces of the first and second body portions 30 and 32 as is well known in the art. In the particular embodiment illustrated, weld lips 80*a* and 80*b* border the upper and lower wall members 34 and 40, respectively. Weld lips 80*a* and 80*b* facilitate the welding of visor structure 14 together.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A visor assembly comprising a one-piece visor structure with a generally horizontal upper wall member, lid member, a first living hinge pivotably coupling the upper wall member and the lid member together, a generally horizontal lower wall member, a second living hinge pivotably coupling the upper wall member and the lower wall member, and at least one partition member coupled to at least one of the upper and lower wall members, the at least one partition member extending between the lower and upper wall members and cooperating with the upper and lower wall members to form a storage compartment, the first living hinge permitting the lid member to pivot between a closed position substantially covering the storage compartment and an open position substantially clearing the storage compartment, and a latch mechanism coupled to the first body portion and the lid member, the latch mechanism securing a second edge of the lid member to the first body portion, the latch mechanism being selectively releasable to permit the lid member to pivot to the first position.

2. The visor assembly of claim 1, wherein the structure is molded from polypropylene.

3. The visor assembly of claim 1, wherein the latch mechanism includes a plurality of slots formed into one of the first body portion and the lid member and a plurality of tangs formed into the other one of the first body portion and the lid member, the plurality of tangs operatively engaging the plurality of slots to secure the lid member to the first body portion.

4. A visor assembly comprising:

a one-piece molded visor structure, the visor structure having a first body portion, a second body portion, a first living hinge and a partition member, the first body portion defining a generally horizontal lower wall member, the second body portion defining a generally horizontal upper wall member, a second living hinge and a lid member, the second living hinge pivotably coupling an edge of the lid member to the upper wall member, the first living hinge pivotably coupling the lower and upper wall members together, the partition member coupled to one of the first and second body portions and extending between the lower and upper wall members to form a storage compartment; and a bracket assembly having a bracket mount and a support post, the bracket mount being adapted for pivotably mounting the visor structure to a vehicle;

wherein a cylindrical recess is formed when the first and second body portions are abutted to one another, the cylindrical recess being spaced apart from the storage compartment and extending through the visor structure and receiving the support post; and wherein the second living hinge permits the lid member to be pivotably moved between a first position in which the lid member substantially clears the storage compartment and a second position in which the lid member substantially covers the storage compartment.

5. The visor assembly of claim 4, further comprising a latch mechanism coupled to the first body portion and the lid member, the latch mechanism securing an edge of the lid member to the first body portion, the latch mechanism being selectively releasable to permit the lid member to pivot to the first position.

6. The visor assembly of claim 5, wherein the latch mechanism includes a plurality of slots formed into one of the first body portion and the lid member and a plurality of tangs formed into the other one of the first body portion and the lid member, the plurality of tangs operatively engaging the plurality of slots when the lid member is in the second position to secure the lid member to the first body portion.

* * * * *